Inventors.
John D. Gibbs, &
Ford E. Smith.
By Merriam, Lorch & Smith,
Attys.

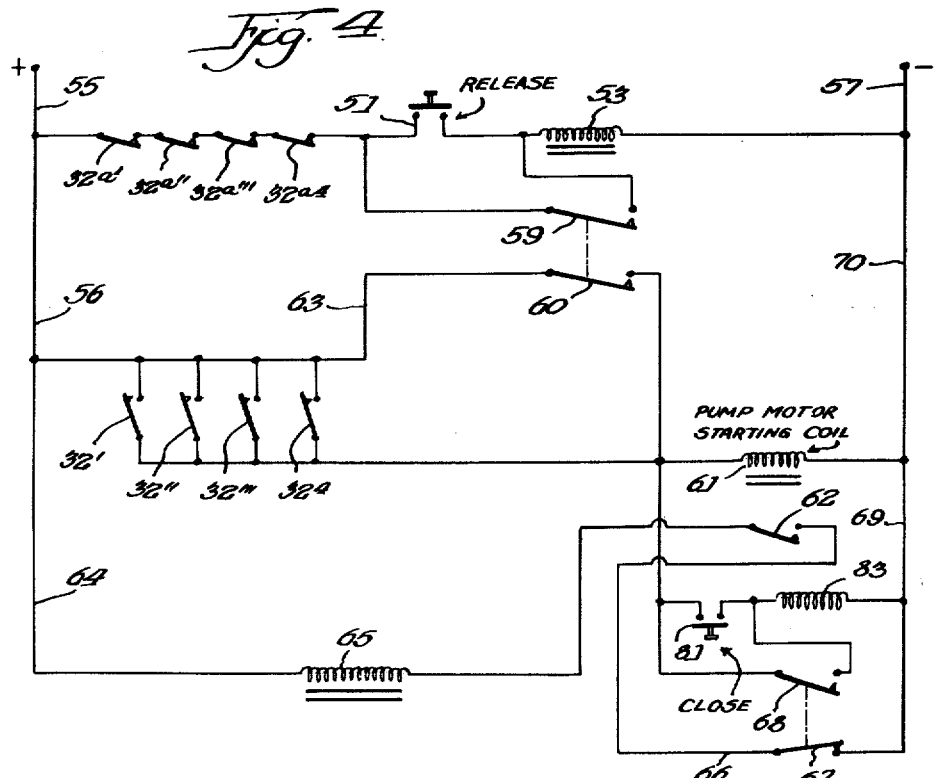

3,113,352
PRESSURE DOOR LOCKING DEVICE
John D. Gibbs and Ford E. Smith, Greenville, Pa., assignors to Chicago Bridge and Iron Company, Chicago, Ill., a corporation of Illinois
Filed Dec. 18, 1958, Ser. No. 781,308
5 Claims. (Cl. 20—16)

This application constitutes a continuation-in-part application of Serial No. 673,875 of like title, filed July 24, 1957, now abandoned.

This invention relates to a locking device or latch for a pressure door and to such a device that is particularly well adapted for use in sealing openings in reactor containment vessel walls.

The development of nuclear reactor power generation plants for peacetime purposes has presented many new and difficult engineering problems. Where nuclear reactor power generation stations are being built, it is now considered necessary that the nuclear reactor be housed in a pressure containment vessel which is designed to contain all radioactive substances which might be released from the reactor in the event of a nuclear accident. Such a containment vessel must be able to withstand internal pressures of the order of 30 to 40 p.s.i. above atmospheric pressure and must also have sufficient openings to give free access for materials, equipment and personnel to pass into the containment vessel. It has, therefore, become necessary to provide doors of relatively large size leading into the containment vessel through the walls thereof and to provide means for sealing such doors effectively to withstand the internal pressures mentioned above and remain sealed for periods which may range as long as 50 years or more. The sealing means must, therefore, be foolproof and not subject to operating breakdowns or power failure.

Furthermore, from the first indication of an emergency arising from a threatened nuclear accident, an extremely short period of time, of the nature of 30 or fewer seconds, is allowed from the sounding of the emergency or "scram" signal to the time when all doors must be closed and locked. It is, therefore, necessary that the door lock be a fast acting means which can be locked within a few seconds after the last person has been evacuated from the containment vessel. In addition to the foregoing, in a nuclear accident there may be a substantial amount of heat emitted which may be sufficient to destroy the effectiveness of pneumatic, electrical, hydraulic, or even mechanical operating means. Despite this, it is necessary that the door remain sealed against the internal pressure of the vessel.

Usually a plurality of locking devices will be attached in spaced relationship around a door opening and it is desirable that they all be interlocked so as to act simultaneously; in addition, it is sometimes desirable to interlock more than one door, as for example the doors at either end of an entrance air lock.

According to this invention a dependable fast acting lock or latch, particularly suitable for the foregoing purposes, is provided by utilizing a latching member that positively forces a door into sealing engagement or into open relation by means of a toggle mechanism that may be powered mechanically, electrically, pneumatically, hydraulically, or manually and which latch will remain locked upon power failure.

The invention will be described in conjunction with the accompanying drawings in which:

FIG. 4 is a schematic electric diagram to effect the control operation obtained by actuation of the control mechanism; and FIG. 5 is a schematic representation of one form of control mechanism of the hydraulic variety for actuating the piston within the control cylinder.

Figure 2:
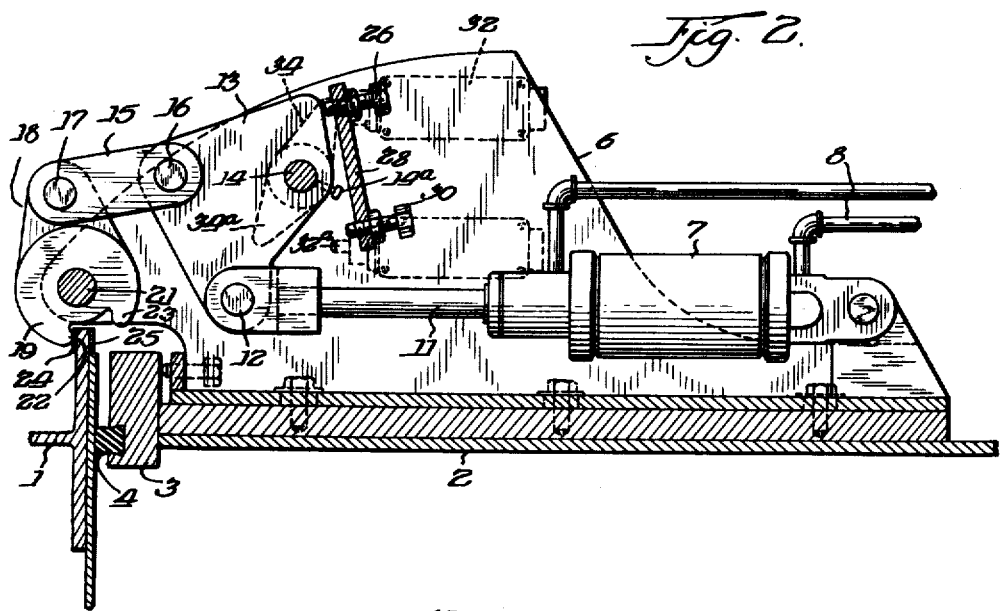
FIG. 2 is a side elevation of the latch with the door and wall in section, illustrating the latch and door in closed or latched position.

In the illustrated embodiment of this invention three latches are shown for securing one side of a door 1 to a containment vessel or entrance lock wall 2, having a door frame 3 attached to the vessel or entrance lock wall 2. A gasket 4 is permanently affixed to this door frame 3 so that when the door 1 is latched, the door is pressed firmly against the gasket 4, as shown in FIG. 2, to provide a seal sufficient to withstand the maximum internal pressures for which the vessel and door are designed.

As shown, the locking device or latch is mounted within a frame consisting of two spaced parallel plates 6, permanently and rigidly affixed to the vessel or entrance lock wall 2 by any suitable means. Pivotally attached to the frame by any convenient means is the operating means 7, shown in the drawings as a hydraulic cylinder and piston device, connected by pipes 8 and 9 to any suitable source of fluid power. It should be understood, however, that pneumatic, electrical, or mechanical means may be employed in an equivalent manner, and also that manual operating means may be employed either as a supplement to one of the other means, or as the only means of operating the locking device, if desired. Cylinder 7 is so mounted that piston rod 11 of the device moves generally in a direction perpendicular to the plane of the door 1 and is pivotally connected by a pin 12 to one portion of a plate link 13 of a toggle mechanism. Link 13 is supported between plates 6 upon a pin 14 being secured thereto by set screw 14a. Pin 14 being journalled in plates 6, it rotates with toggle link 13. The other toggle link is in fact a pair of links 15, pivotally connected at one end by pin 16 to another portion of link 13, and at their other ends by a pin 17 to an arm 18 of a slotted locking disc 19. Disc 19 is mounted upon a pin 21 spanning and journalled in the parallel support plates 6. The disc is provided with a slot or notched recess having a locking shoulder 22 upon one edge of the slot and an opening shoulder 23 upon the other edge which shoulders, during movement of the latch, alternately bear against wear plates 24 and 25 respectively, attached to opposite sides of the door 1. The length of the slot of the notch between the locking shoulder 22 and the opening shoulder 23 is such that with disc rotation to such an angular position that the opening shoulder moves the inner face of the door outwardly, the locking shoulder 22 and the periphery of the disc 19 are rotated to an angular position relative to the door such that the edge of the door, when the door is released from its seating strip or gasket 4, clears the locking shoulder 22.

When it is desired to lock and seal the door against its opening, the door is first put in place across the opening by swinging it upon its hinges (not shown), sliding is or lowering it, as the case may be. Fluid is then applied to the operating cylinder 7 in the usual manner causing piston rod 11 to move outwardly towards the door. Rod 11, through its connecting pin 12, rotates toggle link 13 in a clockwise direction (FIG. 2) about the axis of its pin 14 which, in turn, by bearing through its connection pin 16, moves it and the links 13 and 15 upwardly about pins 14 and 17. This rotates arm 18, disc 19, and pin 21 counter-clockwise about the axes of the latter, forcing locking shoulder 22 against bearing plate 24, thus moving the door 1 and locking it against the sealing gasket 4. In this locked position pin 16, toggle link 13, and the links 16 have crossed over the center of the toggle mechanism, i.e., over the line joining the axes of the pins 14 and 17, so as to be generally above that line.

When this has occurred it can readily be seen that any internal pressure bearing against the internal face of the door 1 applies a force through the bearing plate 24 against the locking shoulder 22 and tends to rotate the disc 19 in a clockwise direction, but this motion is resisted by contact of the toggle link 13 against a stop screw 26, extending through a web 28, spanning plates 6. Counter-clockwise rotation of link 13 will not occur because the toggle links are above their center position.

Even if a failure occurs in the power to cylinder 7 so as to eliminate the operating force transmitted to the locking device through the rod 11, the fact that pin 16 has crossed the center, i.e., the line of the axes of pins 14 and 17, means that a positive locking pressure will continue to be applied through shoulder 22 against bearing plate 24, attached to door 1.

When it is desired to unlock the door, the operation is simply reversed (FIG. 3), that is, fluid applied to the other end of cylinder 7 in the usual manner retracts rod 11, i.e., moves it in a direction generally away from door 1 and rotates the toggle 13 in a counter-clockwise direction which, by means of links 16 rotates the disc 19 in a clockwise direction causing the opening shoulder 23 to bear against the bearing plate 25 and forcing door 1 away from gasket 4, thus breaking the seal and placing the door in position for easy opening. A second stop 30 is provided, extending through web 28 to engage link 13 to limit the rotation of toggle link 13 and thereby limit rotation of disc 19. Stop 30 is so placed and adjusted as to permit the shoulder 23 of disc 19 to be in suitable position when the door is opened.

When the locking device is in the open position (FIG. 3), the pin 16 connecting the toggle link 13 and the linkage 15 is below the center line of the toggle, i.e., below a line drawn between the axes of the pins 14 and 17. In this position, the door 1 is free to be moved out of the way of the opening, either by swinging, sliding, or raising, as the case may be.

It will be noted that in order to unlock the door it is necessary to reverse the off center position of pin 16 or, in other words, to apply a positive force to make the pin 16 cross the line joining the axes of pins 14 and 17, a movement which is resisted or opposed by the force coming from the pressure acting against the internal surface of the door, transmitted as above described through the disc and toggle linkage to the pin 16. Thus, there is no possibility that the door can be accidentally unlocked in the event of the failure of power to the cylinder 7. To unlock the door it is necessary to have more than simply a failure of power to the operating cylinder 7, rather it is necessary that a positive force be applied to unlock the toggle mechanism, i.e., rotate the toggle in a counter-clockwise direction in order to unlock the door.

Obviously, a plurality of locking devices may be located in spaced relationship around a door. Furthermore, a suitable interlocking power supply system can be provided so as to cause all such spaced locking devices to act simultaneously. For example, one hydraulic master cylinder could be used to actuate the pistons in the cylinder 7 of each operating means attached to each locking device. Thus, all locking devices would be interlocked. The same effect can, of course, be accomplished by other than hydraulic means, as for example, by electrical, mechanical, or pneumatic means.

As an aid in such interlocking and to control the operation of cylinder 7, a controlling device, such as a limit switch 32, operable in the usual manner, or a hydraulic or pneumatic valve, or other mechanical control device, is attached to side plate 6 in position to be actuated by an arm 34, secured to and rotatable with pin 14 and toggle link 13, thus controlling the forward or outward motion of the piston rod 11. In a similar manner, the source of power to cylinder 7 is further controlled by a second control device, such as the limit switch 32a, which is mounted on the opposite side of the plate 6 in a position to be actuated by an arm 34a, also secured to and rotatable with pin 14 and toggle link 13. The return motion of the piston rod 11 can thus be controlled.

Figure 1:
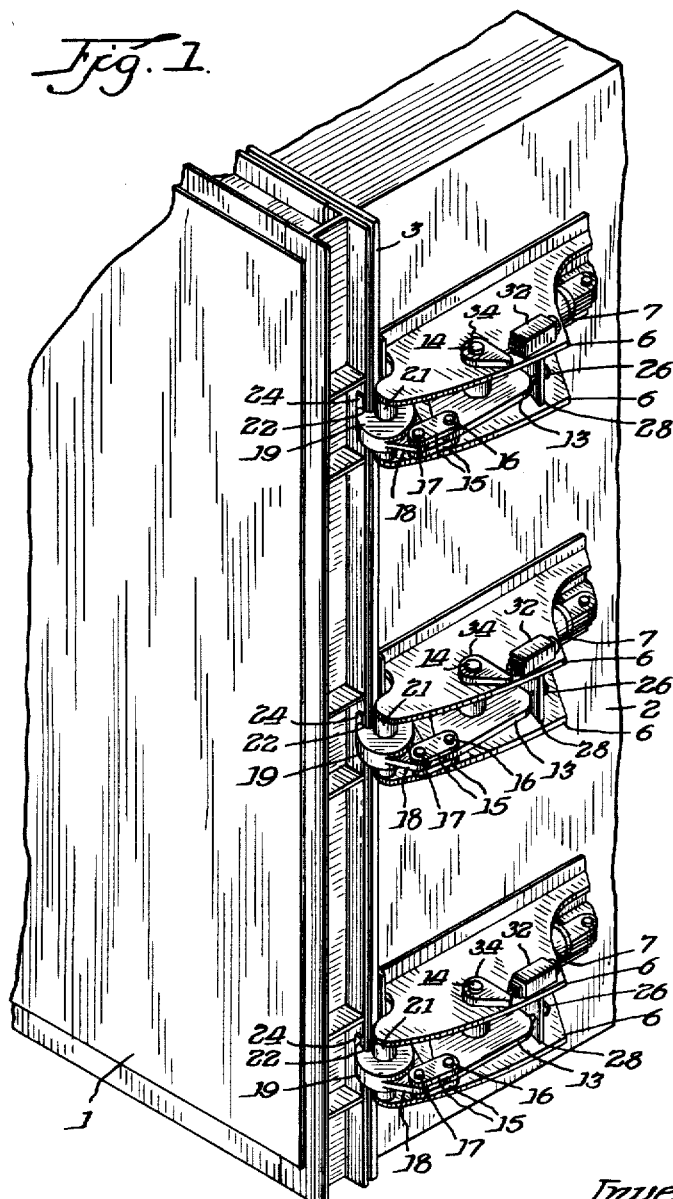
FIG. 1 is a perspective view of a fragment of a door and containment wall having a plurality of the latching devices along one edge of the door in the closed or latched position.
Figure 3:
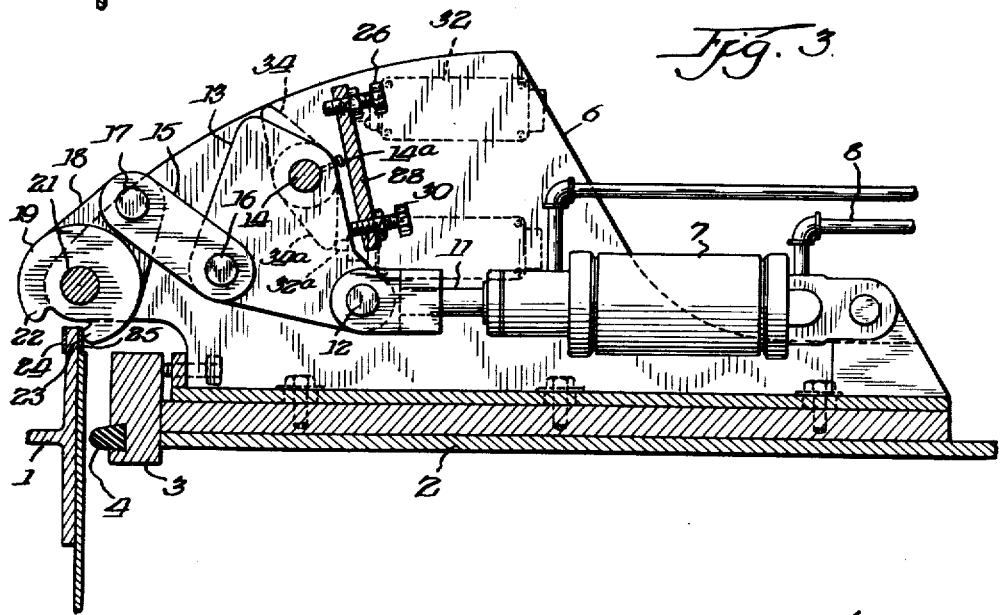
FIG. 3 is a similar view with the latching device and door in its open or unlatched position.

For the purpose of effecting the control of the opening and closing of the door in the fashion above outlined by means of the toggle link, reference may now be made to the circuit diagram, conventionally shown by FIG. 4, together with the showing of FIG. 3 where the arms 34 and 34a, respectively, are shown as controlling limit switches 32 and 32a. For reasons which will be clearly evident in the practical operation of a device of the character here set forth the arms 34 and 34a normally contact and control the position of a plurality of limit switches, such as are shown at $32^1$ through $32^4$ and $32a^1$ through $32a^4$. In this sense the arms successively contact different switch components, illustratively as shown by FIGS. 1, 2 and 3.

It may be assumed that the plunger elements shown within the limit switches, such as 32, to be contacted by arms, such as 34, to be moved inwardly and outwardly successively, causing a plurality of switch elements to close or open, as the case may be. So considered, and assuming, for instance, that the door mechanism 1 is closed, and it is desired to open the same, this operation may be effected by closing the release push button switch, conventionally shown at 51. Assuming that the limit switches $32a^1$ through $32a^4$ are closed since the door 1 is in the closed position, relay coil 53 will be energized by switch closure through the circuit between terminals 55 and 57 through the switch and the coil. Accordingly, the controlled contacts or armatures 59 and 60 of relay 53 are concurrently closed. The closure of the contact 59, as can be seen from the circuit diagram, maintains a closed circuit between terminals 55 and 57 through the limit switches $32a^1$ through $32a^4$, the relay contactor 59 and the relay winding 53 which will maintain the relay energized and hold the contactors 59 and 60 closed.

With contactor 60 closing upon energization of relay 53 a closed circuit is also established from terminal point 55 through conductors 56 and 63 and the contactor 60 through the starting coil 61 for a pump drive motor (see FIG. 5) back to the terminal 57 through conductor 70. Energization of the coil 61 closes the contactor 62, thereby also establishing a circuit closure from terminal 55 through conductors 56 and 64, the solenoid coil 65, the contactor 62, conductor 66, relay contactor 67 (normally closed with closure of the door 1) and conductors 69 and 70 back to the terminal 57.

Energization of the solenoid coil 65 reverses the position of the valve 71, which is normally held in one of its two positions by means of the conventionally indicated spring mechanism 72, serving as an appropriate bias for the valve. With a change in position of the valve 71 from that shown by FIG. 5, hydraulic fluid is pumped by pump 74 to flow from the supply source 73. The pump 74 is driven by the motor 75 (controlled from the motor-starting coil 61 as shown by FIG. 4), and would force fluid through the valve and then through the conduits 9 (valve then in opposite position to that here shown) to cause the pistons within the cylinder 7 to retract and thereby move the piston rods 11 to a retracting position to start the door opening process. As was explained in connection with the actual operation mechanism of FIGS. 1, 2 and 3, this retraction of the piston rod 11 causes toggle 13 to rotate counter-clockwise, and rotate with it the shaft 14 and arms 34 and 34a, also in a counter-clockwise direction.

Movement of the arms 34 in a counter-clockwise direction causes the limit switches $32^1$ through $32^4$ successively to close the indicated contactor, thereby maintaining a closed circuit through the motor starting coil 61 between the terminal points 55 and 57 regardless of the position of the relay contactor 60. Continued rotation of the toggle 13, and with it the shaft 16 and the arms 34 and 34a to a state near the end of the retracting position of the piston 7 causes the arms 34a to contact the limit switches 32a¹ through 32a⁴, thus opening their contacts and opening the circuit to the relay winding 53. This permits the contacts 59 and 60 to return to their normally open position, it being assumed that the armatures or the contactors 59 and 60 are normally biased to an open position to be held closed only with current flowing through the winding 53.

Since the limit switches 32¹ through 32⁴ remain closed for this condition, the circuit through the motor starting coil 61 also remains energized and the pump motor 74 is maintained in operation while the arrangement is in the open position. Since the contactor 62, also normally held biased open, is maintained closed while current flows through the motor starting coil 61, during the period that the pump motor is in operation, and while the contact 67 is closed, the valve solenoid 65 remains energized to hold the valve 71 in such a position as to maintain pressure through the pipes 9 and thereby force the pistons within the cylinder 7 to retract the piston rods 11.

This completes the releasing phase of the operating cycle of the device. To close the device, and thus close the door 1, the next step in the operation is to depress the closing switch button 81 which then closes a circuit from the terminal point 55 through the conductor 56 and the limit switches 32¹ through 32⁴ and the switch 81 to energize the relay coil 83, the circuit being completed through the conductors 69 and 70 to the terminal point 57. This circuit closure causes relay contact 68 to close and relay contact 67 to open, the former contact being held biased normally to remain open and the latter contact being held biased normally to remain closed. Under these conditions the closed relay contact 68 then forms a holding circuit through the relay winding 83 to maintain the contactors or armatures 68 and 67, respectively, closed and open.

Opening of the relay contact 67 breaks the circuit to the valve solenoid 65 and, under these conditions, with the valve solenoid thus deenergized, the valve 71, under the influence of the biasing means conventionally shown at 72, returns to its normal position (as shown). The flow of fluid from the pump 74 is then through the pipe 8, with the return being via the pipe 9, back to the supply, and the oil pressure on the piston in cylinder 7 is thus reversed to cause the piston rod to move (looking at FIG. 5 of the drawing) from right to left. With this, the toggles 13 are rotated clockwise. As this happens, the limit switches 32a¹ through 32a⁴ return to their normal closed position, but even in spite of this condition the relay winding 53 cannot be energized unless or until the starting switch 51 is again depressed.

As clockwise rotation of the arms 34 and 34a is continued and they approach the end of their travel, the limit switches 32¹ through 32⁴ are permitted to return to their normally open position. As soon as the switches 32¹ through 32⁴ are opened, the circuit, heretofore closed through the pump motor starting coil 61 and through the relay coil, is broken, thus, of course, deenergizing the motor starting coil and permitting the relay 83 to open. The contacts 62, 68 and 67 then all return to their normal positions and the pump motor is stopped with the control system reset for the next release cycle of the device.

It, of course, will be appreciated that in some instances more or less than the illustrated number of four limit switches in sequence may be use. Likewise, it will be appreciated that in most normal operations safety and protective devices are included in the circuitry. However, for simplicity of explanation these elements have here been omitted since per se they do not form a part of the broad inventive concept of the control effected.

It can also be seen that this locking device is a fast acting device, not depending upon screws, bolts, nuts or other arrangement which are slow and cumbersome to operate.

While this invention has been described by reference to drawings showing three latches upon one side of a door and door opening, it should be understood that the invention is not limited to the particular embodiment shown, and that many modifications based upon the same principles as described above may be made.

What is claimed is:

1. A pressure door locking and sealing mechanism for securing the door in closed and sealed position with respect to walls and frame surrounding the door opening comprising a gasket fixed to the door frame along at least one side and against which the door is adapted to abut, a toggle mechanism having a plurality of links carried by one of said walls adjacent to the door opening, a pivoted locking disc connected to said toggle mechanism and adapted to be rotated thereby through a limited angle, said disc having a notched recess with one edge providing a locking shoulder positioned to engage the exterior side of said door and force the latter to closed and sealed position against the gasket to seal the door, and the second edge providing an opening shoulder positioned to engage the opposite side of said door and force the latter to open position away from the gasket, the circumferential length of the notched recess on the disc being such that the closing shoulder clears the door edge at such time as the opening shoulder has moved the inner face of the door outwardly from the gasket and the disc has been rotated through the limited angle, and means to actuate and move said toggle mechanism beyond its center position when said disc and door are in locked and open positions.

2. A door locking mechanism as defined in claim 1 wherein said actuating means is a cylinder and piston device including a piston and a piston rod, the piston rod being connected to the toggle to change its position.

3. A door locking mechanism as defined in claim 2 including, in addition, limit switch means positioned to be engaged at the end of movement of said toggle mechanism to control movement of the latter.

4. A door locking mechanism as defined in claim 3 comprising, in addition, a frame attached to one of said side walls and means for pivotally supporting the toggle mechanism and said locking disc from said frame.

5. A door locking mechanism as defined in claim 4 wherein one link of said toggle mechanism is connected to said piston and cycling device and a second link of said toggle mechanism is connected to said locking disc.

References Cited in the file of this patent

UNITED STATES PATENTS

| | | |
|---|---|---|
| 1,815,724 | Otis | July 21, 1931 |
| 1,990,300 | Miller | Feb. 5, 1935 |
| 2,325,225 | Burke | July 27, 1943 |
| 2,513,069 | Weissinger | June 27, 1950 |
| 2,737,621 | Hamilton | Mar. 6, 1956 |
| 2,829,914 | Peras | Apr. 8, 1958 |
| 2,834,504 | Annicq | May 13, 1958 |

UNITED STATES PATENT OFFICE
CERTIFICATE OF CORRECTION

Patent No. 3,113,352            December 10, 1963

John D. Gibbs et al.

It is hereby certified that error appears in the above numbered patent requiring correction and that the said Letters Patent should read as corrected below.

Column 2, line 62, for "is", first occurrence, read -- it --; column 6, line 2, for "use" read -- used --; line 55, for "cycling" read -- cylinder --.

Signed and sealed this 9th day of June 1964.

(SEAL)
Attest:

ERNEST W. SWIDER
Attesting Officer

EDWARD J. BRENNER
Commissioner of Patents